United States Patent [19]

Armstrong, Jr. et al.

[11] 4,369,569

[45] Jan. 25, 1983

[54] TUBE-PULLING APPARATUS

[75] Inventors: Robert S. Armstrong, Jr.; Robert S. Armstrong, both of Manasquan, N.J.

[73] Assignee: Armstrong & Sons, Manasquan, N.J.

[21] Appl. No.: 269,906

[22] Filed: Jun. 6, 1981

[51] Int. Cl.³ .................. B23P 19/04; B23P 15/26
[52] U.S. Cl. ............................ 29/726; 29/252; 29/282
[58] Field of Search ............. 29/726, 252, 282, 157.4, 29/426.5; 254/93 R; 269/48.1, 3, 6

[56] References Cited

U.S. PATENT DOCUMENTS

| | | | |
|---|---|---|---|
| 1,964,023 | 6/1934 | Armstrong | 29/252 |
| 2,697,872 | 12/1954 | Armstrong | 29/252 |
| 3,367,011 | 2/1968 | Sipher | 29/726 |
| 3,369,287 | 2/1968 | Brochetti | 29/252 |
| 3,791,011 | 2/1974 | Keys | 29/252 |
| 3,835,520 | 9/1974 | Sismore | 29/726 |
| 4,000,556 | 1/1977 | Ciminero | 29/252 |
| 4,077,102 | 3/1978 | Smith | 29/252 |

4,095,335  6/1978  Lassarat ..................... 29/726

Primary Examiner—Daniel C. Crane
Attorney, Agent, or Firm—Lerner, David, Littenberg & Samuel

[57] ABSTRACT

Tube-pulling apparatus include expandable gripping jaws and an expansion rod adapted to expand the gripping jaws so that they grip an inner wall of a tube to be pulled from a tube sheet. A first piston, which is connected to the expansion rod, moves the expansion rod relative to the gripping jaws to effect their expansion. After the gripping jaws are fully expanded, the first piston cooperates with a second piston, which is connected to the gripping jaws, to conjointly retract the expansion rod and the gripping jaws, thereby extracting the tube. If the gripping jaws are misadjusted resulting in their complete expansion before the first piston assumes its cooperative relationship with the second piston, retraction of the second piston is prevented, thereby automatically aborting the tube-pulling operation to prevent damage to the tube sheet.

6 Claims, 4 Drawing Figures

TUBE-PULLING APPARATUS

FIELD OF THE INVENTION

The present invention relates to tube-pulling apparatus and, more particularly, to such apparatus which are adapted to pull tubes from tube sheets of heat exchangers, condensers and similar equipment.

BACKGROUND OF THE INVENTION

In condensers, boilers, and heat exchangers where two fluids are brought into thermal communication, it is customary to pass one fluid through a plurality of tubes and to pass the other fluid around the exterior of the tubes. The fluid passing around the exterior of the tubes is contained in the shell of the heat exchanger. In most constructions, the tubes are spaced apart and separated from the fluid in the shell by two end plates commonly known as tube sheets. Each tube sheet contains a plurality of holes into which the tubes are inserted. The tubes extend between the tube sheets so that a fluid-tight barrier is formed between the two fluids. To anchor each tube in its respective hole in the tube sheet, the end of the tube is expanded and flared.

It is customary to replace heat exchanger tubes after they have become corroded and pitted and when they commence leaking fluid across the barrier. In replacing tubes, it is common to hydraulically extract the old tubes from the tube sheet and replace them with new tubes.

Hydraulically-operated tube pullers are well known and generally include a tubular housing placed in abutment with a tube sheet so that a gripping member projecting therefrom will be received within the tube to be extracted. The gripping member is radially expanded into biting engagement with the internal surface of the tube by a wedging element. A first piston, which is connected to the wedging element, moves the wedging element relative to the gripping member to effect its expansion. The first piston cooperates with a second piston, which is connected to the gripping member, to conjointly retract the wedging element and the gripping member, resulting in the extraction of the tube from the tube sheet.

Tube pullers of the above-described type are disclosed in, for instance, U.S. Pat. Nos. 2,697,872; 3,369,287; and 3,791,011. The tube pullers disclosed in these patents all suffer from a common problem which seriously impairs their ability to effectively and efficiently perform tube-pulling operations. This problem involves the inability of these tube pullers to prevent the retraction of their gripping members when they have been overexpanded. Such overexpansion of the gripping members typically results from the manual misadjustment of the gripping members during their preexpansion setting, whereby the wedging elements overexpand the gripping members prior to their retraction. If tube-pulling operations are performed while the gripping members are overexpanded, serious damage may be done to the tube sheet, thereby requiring its replacement in addition to the replacement of the tubes.

SUMMARY OF THE INVENTION

The above-described shortcoming of the prior art tube pullers is overcome by the tube-pulling apparatus of the present invention which includes a cylinder adapted to receive fluid from a suitable source through a stationary feed pipe extending into the cylinder from the rear thereof. A first piston, which has an interior cavity, is slideably mounted on the feed pipe for reciprocating movement in the cylinder. A second piston is mounted for reciprocating movement within the cavity of the first piston. The pistons cooperate to form a chamber therebetween.

A gripping device, such as a plurality of radially expandable gripping jaws, can be expanded by an expansion device, such as a wedge-shaped rod, to releasably grip an inner wall of a tube to be pulled from a tube sheet or a similar member. The gripping device is fixedly connected to the second piston for conjoint movement therewith. The conjoint movement of the expansion device and the first piston is achieved by fixedly connecting them to each other.

A first fluid flow path is provided between the feed pipe and the chamber formed between the pistons, whereby fluid supplied to the chamber from the feed pipe moves the first piston rearward, i.e., towards the rear of the cylinder, while urging the second piston forward, i.e., towards the front of the cylinder. After the first piston has moved rearward a predetermined distance relative to the second piston, the chamber also communicates with a front portion of the cylinder through a second fluid flow path, so that fluid supplied to the chamber from the feed pipe can flow into the front portion of the cylinder. The fluid supplied to the front portion of the cylinder causes the conjoint rearward movement of the pistons, resulting in the retraction of the tube from the tube sheet. A fluid flow inhibitor, such as a fluid-tight seal, inhibits the flow of fluid from the chamber to the front portion of the cylinder until the first piston moves rearward its predetermined distance relative to the second piston.

After retraction of the tube, the pistons are moved forward in the cylinder, so that they are ready for another tube-pulling operation. During this forward movement of the pistons, fluid communication between the front portion of the cylinder and the chamber is maintained, so that fluid in the front portion of the cylinder can be exhausted therefrom along a third fluid flow path. The exhausted fluid flows from the chamber into the feed pipe and back to the source. During the rearward movement of the pistons, a second fluid flow inhibitor inhibits the flow of fluid through the third fluid flow path at least until the first piston moves rearward its predetermined distance relative to the second piston.

The first and second fluid flow inhibitors cooperate to prevent any rearward movement of the second piston and hence the gripping device until the first piston moves rearward its predetermined distance relative to said second piston. Thus, in situations where the gripping device fully engages the tube before the first piston has moved rearward its predetermined distance, rearward movement of the second piston and hence the gripping means is positively prevented, thereby automatically aborting the tube-pulling operation to prevent damage to the tube sheet.

BRIEF DESCRIPTION OF THE DRAWINGS

For a more complete understanding of the present invention, reference may be had to the following description of an exemplary embodiment considered in connection with the figures of the accompanying drawings, in which.

DESCRIPTION OF THE EXEMPLARY EMBODIMENT

Figure 2:
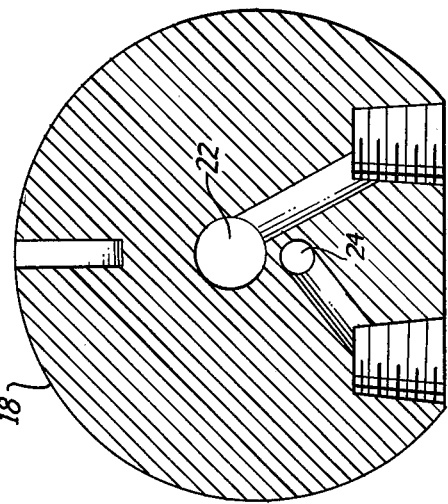
FIG. 2 is a cross-sectional view, taken along line I—I in FIG. 1 and looking in the direction of the arrows, of the tube-pulling apparatus of FIG. 1.

Referring to the drawings, there is shown a tube puller 10 including a hydraulic cylinder 12 which has a front end 14 and a rear end 16. A handle 18 is attached to the rear end 16 of the cylinder 12. The handle 18 includes a conventional air bleed-off trigger mechanism 20, the operation of which will be described hereinafter, and pair of ports 22, 24 (see FIG. 2) for supplying and exhausting fluid to and from the cylinder 12. A feed tube 26 is threadedly attached to the handle 18. The feed tube 26, which is arranged coaxially with respect to the cylinder 12, has a central longitudinal bore 28 extending therethrough and communicating with the port 22 in the handle 18.

A gland 30, having an annular recess 32 in a rear end 34 thereof, is threadedly attached to the front end 16 of the cylinder 12. A front end 36 of the gland 30 threadedly receives a brace 38. A lock nut 40 fixes the position of the brace 38 relative to the gland 30.

Projecting from a front end 42 of the brace 38 is a tube gripping assembly 44, which includes a plurality of radially movable gripping jaws 46 and a jaw holder 48, and a mandrel assembly 50, which includes a tapered expansion mandrel 52 and a mandrel holder 54. The expansion mandrel 52 is designed to effect the radial movement of the gripping jaws 46 in response to the axial movement of the mandrel assembly 50 relative to the gripping assembly 44. An O-ring 56 urges the gripping jaws 46 against the expansion mandrel 52. The gripping jaws 46 are keyed to the jaw holder 48, which is slideably received within the brace 38 and attached to a front end 58 of an auxiliary shaft 60 adapted for reciprocating movement in the brace 38. The mandrel holder 54 is threadedly received in front end 62 of a main shaft 64 adapted for reciprocating movement in the brace 38.

The main shaft 64, which extends through the auxiliary shaft 60 into the cylinder 12, reciprocates relative to the auxiliary shaft 60 in a manner to be described hereinafter. A rear end 66 of the main shaft 64 has a blind bore 68, which is sized so as to permit the main shaft 64 to reciprocate on the feed tube 26. The diameter of the blind bore 68 is slightly larger than the outer diameter of the feed tube 26 to permit the free passage of hydraulic fluid between an inner wall 70 of the main shaft 64 and an outer wall 72 of the feed tube 26. The rear end 66 of the main shaft 64 is threadedly attached to a main piston 74, which is slideably mounted on the feed tube 26 for reciprocating movement within the cylinder 12. A front end 76 of the main piston 74 has an interior cavity 78, which slideably receives an auxiliary piston 80 such that the auxiliary piston 80 can reciprocate axially relative to the main piston 74 in the cavity 78. The cavity 78 has a small diameter portion 82 and a large diameter portion 84.

Figure 3:
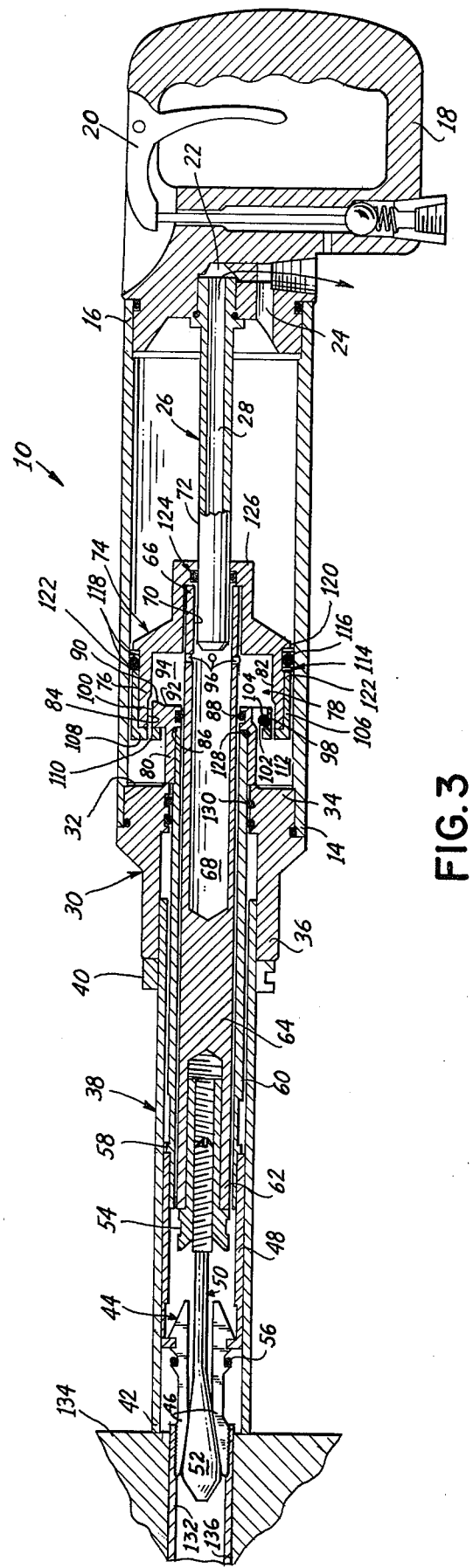
FIG. 3 is a longitudinal cross-sectional view of the tube-pulling apparatus of FIG. 1, the apparatus being shown gripping a tube to be pulled from a tube sheet.
Figure 4:
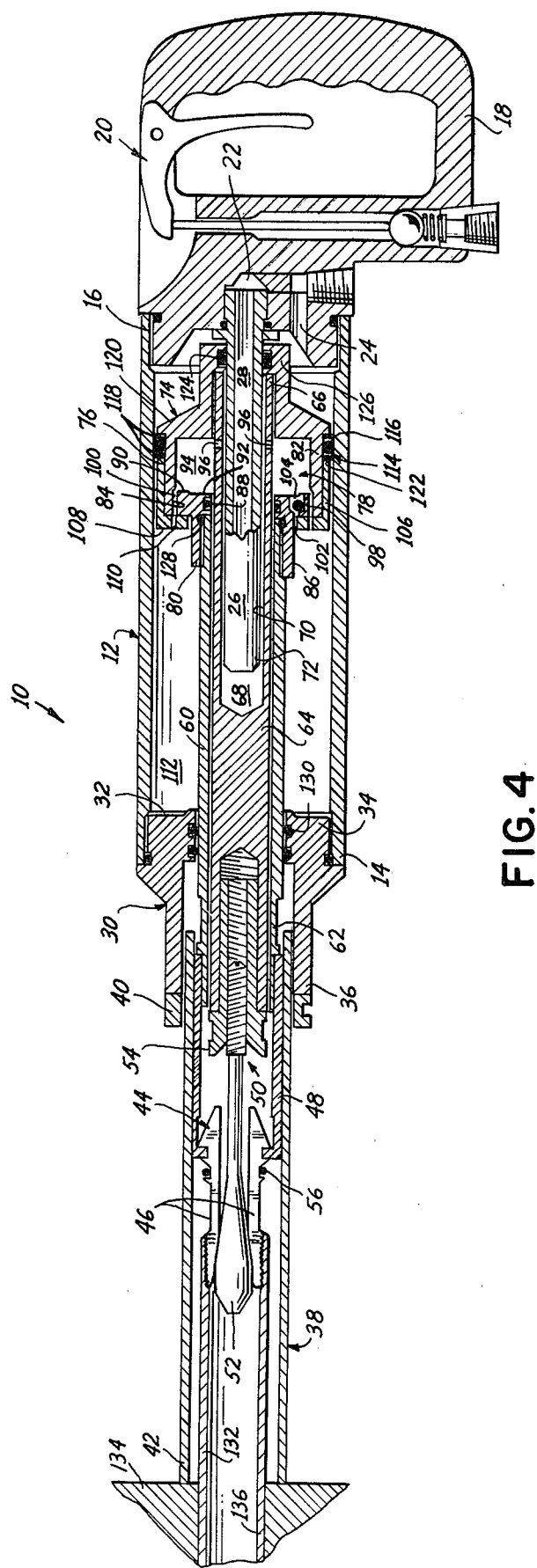
FIG. 4 is a longitudinal cross-sectional view of the tube-pulling apparatus of FIG. 1, the apparatus being shown after the tube has been pulled from the tube sheet.

The auxiliary piston 80 is threadedly attached to a rear end 86 of the auxiliary shaft 60, which also extends into the cylinder 12. A fluid-tight seal 88 prevents hydraulic fluid from escaping between the main shaft 64 and the auxiliary shaft 60. A rear end 90 of the auxiliary piston 80 is provided with an annular recess 92, which cooperates with the main piston 74 to form a chamber 94. The chamber 94 communicates with four radial passageways 96 provided in the main shaft 64 to permit the passage of hydraulic fluid from the blind bore 68 of the main shaft 64 to the chamber 94. The auxiliary piston 80 also includes an annular radially extending flange 98 having a diameter selected such that the flange 98 slideably and sealingly engages the small diameter portion 82 of the cavity 78 of the main piston 74 and a length which is shorter than the length of the large diameter portion 84 of the cavity 78 whereby an annular void 100 (see FIGS. 3 and 4) is left in the large diameter portion 84 when the flange 98 is disposed therein. A plurality of axial passageways 102 is provided in the flange 98 to permit the passage of hydraulic fluid through the auxiliary piston 80. The flow of hydraulic fluid through the passageways 102 is controlled by balls 104, each of the balls 104 being moveably positioned in a corresponding one of the passageways 102 so as to selectively open and close it in response to the direction of flow of the hydraulic fluid.

The main piston 74 also includes a thrust cup 106, which is threadedly attached to the front end 76 of the main piston 74. The thrust cup 106 limits the axial movement of the main piston 74 relative to the auxiliary piston 80. A front end 108 of the thrust cup 106 is provided with a plurality of passageways 110, which permit the passage of hydraulic fluid from the void 100 (see FIGS. 3 and 4) to a chamber 112 formed between the recess 32 in the rear end 34 of the gland 30 and the front end 108 of the thrust cup 106.

A sealing member 114, comprising a standard O-ring 116 with back-up washers 118, is positioned between a shoulder 120 of the main piston 74 and a rear end 122 of the thrust cup 106 to prevent the leakage of hydraulic fluid from one side of the main piston 74 to the other. A similar sealing member 124 is provided between a rear end 126 of the main piston 74 and the feed tube 26. Other sealing members 128, 130 are provided in the auxiliary piston 80 and the gland 30, respectively.

In operation, the gripping jaws 46 are adjusted to a preexpansion setting by manually turning the expansion mandrel 52. The particular setting employed is generally dependant upon the size of the tube to be pulled. However, inasmuch as the tube puller 10 is not equipped to automatically determine a proper preexpansion setting, obtaining the proper preexpansion setting depends largely on the skill of the operator using the tube puller 10.

Figure 1:
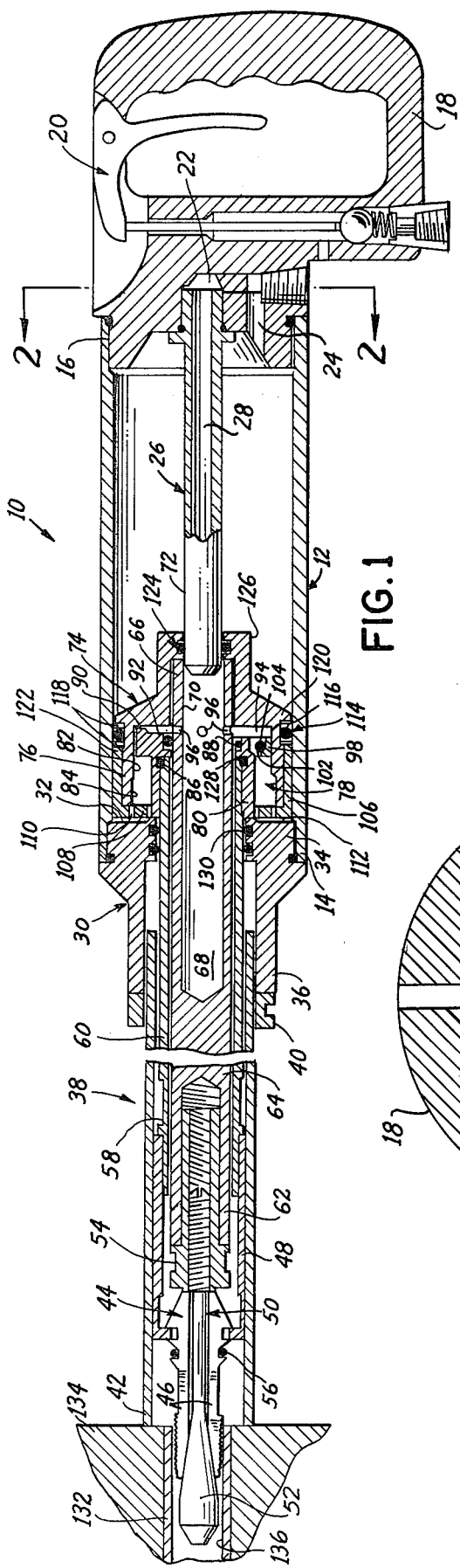
FIG. 1 is a longitudinal cross-sectional view of a tube-pulling apparatus constructed in accordance with the present invention, the apparatus being shown prior to commencement of a tube-pulling operation.

After the gripping jaws 46 have been adjusted to the desired preexpansion setting, the ports 22, 24 are connected to a standard hydraulic intensifier (not shown) by two hydraulic lines (not shown). The gripping assembly 44 is inserted into a tube 132 to be pulled from a tube sheet 134 until the brace 38 abuts against the tube sheet 134 (see FIG. 1). Upon actuation of the trigger mechanism 20, hydraulic fluid is fed under pressure from the intensifier through the port 22 into the feed tube 26. Simultaneously, hydraulic fluid is exhausted from the cylinder 12 to the intensifier through the port 24.

The hydraulic fluid supplied to the feed tube 26 forces hydraulic fluid in the blind bore 68 of the main shaft 64 through the radial passageways 96 and into the chamber 94. Because the auxiliary piston 80 abuts against the rear end 34 of the gland 30, the introduction of additional hydraulic fluid into the chamber 94 causes the main piston 74 to retract rearwardly, thereby increasing the size of the chamber 94. The size of the chamber 94 will continue to increase until the flange 98 of the auxiliary piston 80 abuts the front end 108 of the thrust cup 106 (see FIG. 3). During the expansion of the chamber 94, the hydraulic fluid in the chamber 94 urges the auxiliary piston 80 firmly against the rear end 34 of the gland 30. The balls 104 prevent the hydraulic fluid in the chamber 94 from passing through the auxiliary piston 80. Also, the fluid-tight seal formed between the flange 98 of the auxiliary piston 80 and the small diameter portion 82 of the cavity 78 in the main piston 74 prevent the hydraulic fluid in the chamber 94 from flowing at any appreciable rate past the flange 98 of the auxiliary piston 80.

The rearward retraction of the main piston 74 causes the conjoint rearward movement of the main sahft 64 and hence the mandrel assembly 50. The resulting rearward movement of the expansion mandrel 52 causes the outward radial movement of the gripping jaws 46, so that the jaws 46 will bite into an innner surface 136 of the tube 132. Because the auxiliary piston 80 is still being urged forward against the rear end 34 of the gland 30 by the hydraulic fluid in the chamber 94, the auxiliary shaft 60, the jaw holder 48, and the jaws 46 are not permitted to retract rearwardly, thereby preventing premature retraction of the gripping jaws 46 until the entire gripping action is completed. Thus, even if the gripping jaws 46 are inadvertently misadjusted during their manual preexpansion setting so that the expansion mandrel 52 overexpands the gripping jaws 46 before the entire gripping action is completed, the forward acting forces exerted on the auxiliary piston 80 by the hydraulic fluid in the chamber 94 counteract the opposing forces exerted on the auxiliary piston 80 by the expansion mandrel 52 to prevent any rearward movement of the auxiliary piston 80, thereby automatically aborting the tube-pulling operation to prevent damage to the tube sheet 134.

Inasmuch as the large diameter portion 84 of the cavity 78 is longer than the flange 98, the hydraulic fluid in the chamber 94 is permitted to flow around the flange 98 when the flange 98 abuts the front end 108 of the thrust cup 106. Thus, once the gripping action has been completed, the hydraulic fluid flowing past the flange 98 of the auxiliary piston 80 passes through the void 100 and the passageways 110 into the chamber 112. The hydraulic fluid flowing into the chamber 112 causes the continued retraction of the main piston 74 and hence the thrust cup 106, which, due to its abutment with the auxiliary piston 80, causes the conjoint retraction of the auxiliary piston 80 and hence the auxiliary shaft 60, the jaw holder 48 and the jaws 46, thereby extracting the tube 132 from the tube sheet 134 under great hydraulic force (see FIG. 4).

Upon release of the trigger mechanism 20 after completion of the tube-pulling operation, the intensifier reverses the flow of oil in both hydraulic lines so that hydraulic fluid is delivered to the cylinder 12 through the port 24, thereby causing the forward movement of the main piston 74 and the auxiliary piston 80. Hydraulic fluid in the chamber 112 flows out past the flange 98 of the auxiliary piston 80 and simultaneously through the pssageways 102, which are no longer closed by the balls 104.

When the auxiliary piston 80 abuts the rear end 34 of the gland 30, the forward movement of the auxiliary piston 80 stops, while the forward movement of the main piston 74 continues. This causes the inward radial movement of the gripping jaws 46 to initiate their disengagement from the extracted tube 132. Once the flange 98 of the auxiliary piston 80 reaches the small diameter portion 102 of the cavity 78 of the main piston 74, the hydraulic fluid remaining in the chamber 112 can only exhaust through the passageways 102 due to the fluid-tight seal between the flange 98 and the small diameter portion 82 of the cavity 78. The forward movement of the main piston 74 continues until it abuts the rear end 90 of the auxiliary piston 80. This completes the disengagement of the gripping jaws 46 from the extracted tube 132.

It will be understood that the embodiment described herein is merely exemplary and that a person skilled in the art may make many variations and modifications without departing from the spirit and scope of the invention. For instance, the fluid-tight seal between the flange 98 of the auxiliary piston 80 and the small diameter portion 82 of the cavity 78 of the main piston 74 may be achieved by providing the flange 98 with its own sealing member, such as an O-ring. All such modifications and variations are intended to be included within the scope of the invention as defined in the appended claims.

We claim:

1. Tube-pulling apparatus, comprising a cylinder, having a front end and a rear end; a stationary feed pipe extending into said cylinder from said rear end thereof, said feed pipe including supplying means for supplying fluid to said cylinder; a first piston slideably mounted on said feed pipe for reciprocating movement in said cylinder, said first piston including an interior cavity; a second piston mounted for reciprocating movement within said cavity of said first piston, said second piston cooperating with said first piston to form a chamber therebetween; expandable gripping means for releasably gripping an inner wall of a tube to be pulled from a tube sheet when said gripping means is expanded, said gripping means being fixedly connected to said second piston, whereby said gripping means is moveable conjointly with said second piston; expanding means for expanding said gripping means, said expanding means being fixedly connected to said first piston, whereby said expanding means is moveable conjointly with said first piston; first providing means for providing fluid communication between said feed pipe and said chamber, whereby fluid supplied to said chamber move said first piston towards said rear end of said cylinder while urging said second piston towards said front end of said cylinder; second providing means for providing fluid communication between said chamber and a front portion of said cylinder after said first piston has moved rearward a predetermined distance relative to said second piston, whereby fluid supplied to said front portion of said cylinder from said chamber causes the conjoint rearward movement of said first and second pistons, said second providing means including first inhibiting means for inhibiting fluid to flow from said chamber to said front portion of said cylinder until said first piston has moved rearward said predetermined distance; third providing means for providing fluid communication between said front portion of said cylinder and said chamber during the forward movement of said first piston in said cylinder, whereby fluid in said front portion of said cylinder is exhausted therefrom through said third providing means during the forward movement of said first piston in said cylinder, said third providing means including second inhibiting means for inhibiting fluid to flow from said chamber to said front portion of said cylinder at least until said first piston has moved rearward said predetermined distance, said second inhibiting means cooperating with said first inhibiting means to prevent any rearward movement of said second piston and hence said gripping means until said first piston and hence said expanding means move rearward said predetermined distance, thereby preventing rearward movement of said second piston and hence said gripping means in situations where said gripping means fully engages a tube to be pulled before said first piston and hence said expanding means move rearward said predetermined distance, whereby tube-pulling operations are automatically aborted in such situations to prevent damage to a tube sheet from which a tube is to be pulled.

2. Tube-pulling apparatus according to claim 1, further comprising connecting means for fixedly connecting said expanding means to said first piston, said connecting means extending through said second piston and having a first end attached to said first piston and a second end attached to said expanding means.

3. Tube-pulling apparatus according to claim 2, wherein said first providing means includes a blind bore, which is provided in said first end of said connecting means and sized and shaped to slideably receive said feed pipe, and a plurality of first passageways communicating between said bore and said chamber formed between said first and second pistons.

4. Tube-pulling apparatus according to claim 1, 2 or 3, wherein said cavity of said first piston includes a small diameter portion and a large diameter portion, having a predetermined length; said second piston includes an annular flange having a diameter selected such that said flange slideably and sealingly engages said small diameter portion of said cavity of said first piston and a length which is shorter than said predetermined length of said large diameter portion of said cavity of said first piston, whereby an annular void is left in said large diameter portion when said flange is disposed therein; and said second providing means includes said void and a plurality of second passageways formed in said first piston and communicating between said void and said front portion of said cylinder.

5. Tube-pulling apparatus according to claim 4, wherein said first inhibiting means includes a sealing member mounted in said flange of said second piston.

6. Tube-pulling apparatus according to claim 4, wherein said third providing means includes a plurality of third passageways provided in said second piston and communicating between said front portion of said cylinder and said chamber formed between said first and second pistons and said second inhibiting means includes a plurality of balls which selectively close and open said third passageways.

* * * * *